United States Patent Office 3,367,379
Patented Feb. 6, 1968

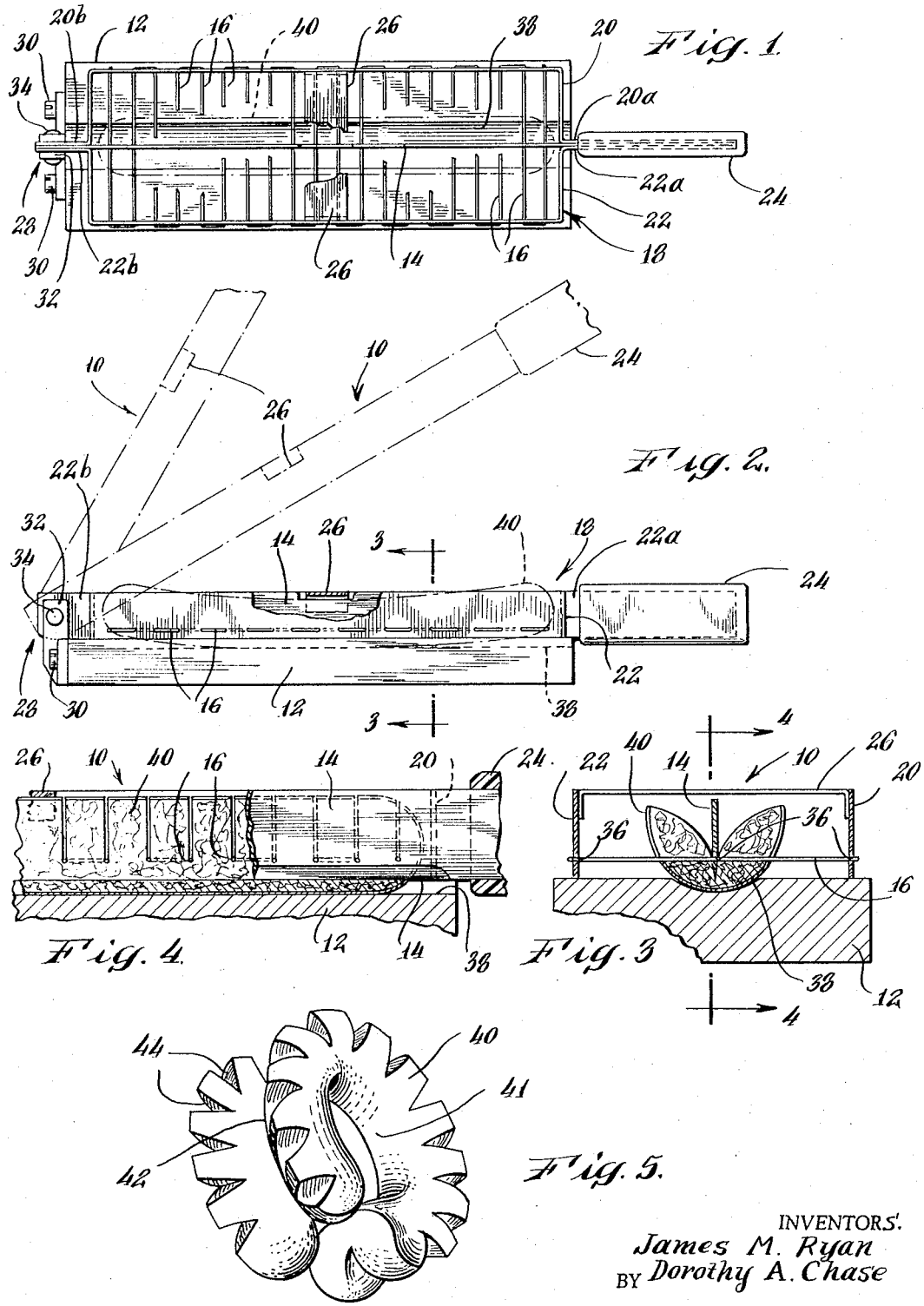

3,367,379
CUTTING DEVICE FOR FRANKFURTERS
AND THE LIKE
James M. Ryan, 178 Cedar Heights Road, Stamford,
Conn. 06902, and Dorothy A. Chase, Elmwood
Road, Vista, N.Y.
Filed Oct. 20, 1965, Ser. No. 498,875
8 Claims. (Cl. 146—147)

ABSTRACT OF THE DISCLOSURE

The disclosed cutter includes a longitudinal cutting element and a series of spaced transverse cutting elements which when brought into cutting engagement with a frankfurter or the like, effect a series of transverse cuts intersected by a longitudinal cut of depths in excess of one-half the thickness, but less than the full thickness of the frankfurter. A cooked frankfurter preconditioned by the disclosed cutter assumes an annular configuration.

It is well-known in the culinary art that during the process of cooking frankfurters with its skin intact, the juices within eventually burst the skin. The cooked hot dog thus takes on a rather unslightly appearance. To remedy this, it has been the common practice to lacerate or puncture the skin of the frankfurter prior to cooking. This provides openings in the skin of the frankfurter from which the juices may escape during the cooking process. It has been recognized that if the skin of the frankfurter is sufficiently lacerated such that during the cooking process, the meat exudes through the cuts in the skin and thus is directly subjected to the cooking process. This has been found to not only speed up the time required to cook frankfurters but also to enhance their flavor. Moreover, it is found that a frankfurter so prepared is considerably more tender, and thus more readily masticated.

The "hot dog" and the "hamburger" have long been American institutions. There are commercially available "hot dog" buns and "hamburger" buns which have markedly different configurations. Thus, frankfurters cannot be conveniently accommodated in a "hamburger" bun and vice versa. Accordingly, frankfurters are typically served in the elongated "hot dog" buns; this being the only really suitable application for such buns. The round "hamburger" buns are more universally applicable. It is not an uncommon occurrence for one serving "hot dogs" to run out of or neglect to purchase beforehand the elongated "hot dog" buns specially designed to accept the elongated configuration of frankfurters. Being confronted with this situation, one is obliged to improvise with bread slices, cut the frankfurters in half so that they may be accommodated in a round bun, or serve the frankfurters on a plate to be eaten with utensils. Any one of these improvisations is less than satisfactory.

We have discovered that by effecting a series of discrete cuts at selective locations along the length of a frankfurter prior to cooking, the frankfurter will curl up during the cooking process such that it finally assumes the configuration of a "donut" with its ends virtually coming together. Thus, not only do we derive the recognized benefits of faster cooking time, tenderization, and enhance taste, but we derive the further benefit in that the cooked frankfurter assumes a configuration compatible with round "hamburger" buns, as well as bread slices.

Accordingly, it is an object of the present invention to provide a device for selectively cutting a frankfurter or the like.

An additional object of the present invention is to provide a frankfurter cutter of the above character which renders a cooked frankfurter physically compatible with round or substantially square shaped bread products.

A further object of the present invention is to provide a frankfurter cutter of the above character which is simple in design, economical to manufacture, and convenient to operate.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIGURE 1 is a top view of a frankfurter cutter constructed according to our invention;

FIGURE 2 is a side elevational view of the frankfurter cutter of FIGURE 1;

FIGURE 3 is a sectional view taken along line 3—3 of FIGURE 2;

FIGURE 4 is a fragmentary longitudinal sectional view taken along line 4—4 of FIGURE 3; and FIGURE 5 is a pictorial illustration in perspective showing the configuration assumed by a cooked "hot dog" which has been pre-conditioned by the cutter of FIGURES 1 through 4.

Similar reference numerals refer to the same parts throughout the several views of the drawing.

Referring now to the drawing, the cutter constructed according to our invention comprises a cutting member, generally indicated at 10, pivotally connected at one end to a base member 12 as best seen in FIGURE 2. Referring to FIGURE 1, the cutting member 10 is comprised of a single longitudinal knife blade 14 and a series of spaced transverse cutting elements 16 mounted by a frame, generally indicated at 18. The frame 18 is formed by a pair of frame members 20 and 22. The frame members 20 and 22, which may be formed of steel or other suitably rigid material, are generally U-shaped with their ends bent at right angles so as to lie on opposite sides of the knife blade 14. The end portions 20a and 22a of the frame members 20 and 22 extending along opposite sides of the knife blade 14 may be spot welded or otherwise affixed to the knife blade. A handle 24 is fitted on the end portions 20a and 22a of the frame members and the end of the knife blade 14 to facilitate operation of the cutting member 10.

The other end portions 20b and 22b, as seen best in FIGURE 1, extending longitudinally along opposite sides of the knife blade 14, are similarly spot welded to the knife blade. A cross member 26 spans across the top of the frame 18 with its end portions spot welded or otherwise affixed to the frame members 20 and 22 to add rigidity.

A hinge, generally indicated at 28 in FIGURES 1 and 2, is affixed to the end surface of the base member 12 by suitable means such as screws 30. The hinge 28 incldes a pair of upwardly extending tabs 32 which are spaced apart to receive therebetween the end portions 20b, 22b of frame members 20, 22 and the end portion of the knife blade 14 sandwiched therebetween. A pin, such as a rivet 34, extends through aligned holes in the hinge arm 32 and the end portions of the frame 18 and knife blade 14 so as to pivotally connect the cutting member 10 to the base member 12.

The transverse cutting elements 16 are formed from a single wire strand which is threaded back and forth through a series of aligned holes 36 drilled in the frame members 20, 22 and the knife blade 14 as best seen in FIGURES 2 and 3.

Referring to FIGURES 3 and 4, the base member 12 is provided with a centrally located, elongated recess 38 which is aligned with the knife blade 14.

In operating the cutter of our invention, the cutting member is swung to a generally upright position as seen in phantom in FIGURE 2, and a frankfurter 40 is positioned lengthwise in the longitudinally extending recess 38. The cutting member 10 is then swung downwardly to the point where the bottom edges of the frame members 20 and 22 hit the flat top surface of the base 12 beyond the recess 38. With the cutting member 10 moved to this position, it will be seen that the knife blade 14 effects a single longitudinal cut along the entire length of the frankfurter 40. At the same time, the transverse cutting element 16 effects a series of equally spaced transverse cuts also along the entire length of the frankfurter 40. It is important to note that the various cuts in the frankfurter 40 do not extend completely therethrough. However, for best results, the various cuts should extend more than half way through the frankfurter 40.

Now, if the frankfurter 40, after having been prepared by the cutter of our invention, is cooked it will curl up into the configuration shown in FIGURE 5. It is seen that the frankfurter 40 assumes the general configuration of a "donut" with its ends practically coming together. The configuration assumed by the frankfurter 40 after cooking is explained by the fact that, during cooking, the meat of the frankfurter effectively exudes from the various cuts in the outer surface causing a differential elongation between the lacerated side of the frankfurter and the smooth side 41. Thus, the frankfurter 40 assumes the configuration of FIGURE 5 with the smooth side 41 defining the central opening in the assumed "donut" configuration.

It will be readily appreciated from FIGURE 5 that the longitudinal cut made by the knife blade 14 is shown at 42 while the series of transverse cuts made by the cutting elements 16 are shown at 44. For best results, we have found that the cutting elements 16 should be spaced apart by approximately ¼ to ½ of an inch. It will be appreciated that if the cutting elements 16 are too widely spaced apart from the frankfurter configuration of FIGURE 5 may not be fully achieved.

It is thus seen that we have provided a novel cutter for producing selective cuts in a frankfurter such that when cooked the frankfurter curls up into an annular configuration. The frankfurter, so prepared, is found to be more tender, tastier, and capable of beeing cooked in less time. More significantly, however, the frankfurter by virtue of its angular configuration, is compatible with and thus can be served on round "hamburger" buns. This has the additional advantage in that the central opening defined by the cooked frankfurter may be filled with chilli and the like, thus adding variety.

While the disclosed cutter construction is preferred, it will be appreciated that the selective cuts in the frankfurter may be achieved with various modified cutter constructions. For example, the cutting member 10 may be mounted for reciprocal movement rather than pivotal movement about a hinge. Moreover, the cutting member could be formed as a rotating cutting member having an annular knife blade to effect the longitudinal cuts in the frankfurter and one or more transverse cutting elements to effect the transverse cuts. The frankfurter would then be fed past the rotating cutting member. It will be appreciated that in all such modified structures, means must be provided to prevent the various cutting elements from cutting completely through the frankfurter.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing should be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. A cutting device for frankfurters and the like, said cutting device comprising, in combination:
   (A) a first cutting element for effecting a longitudinal cut in a frankfurter;
   (B) a plurality of spaced second cutting elements for effecting a series of spaced transverse cuts in a frankfurter intersecting said longitudinal cut;
   (C) means mounting said first and second cutting elements for movement into cutting engagement with a frankfurter; and
   (D) limiting means carried by said mounting means to limit the extent of said cutting engagement to less than the thickness of a frankfurter;
   (E) whereby upon the cooking of a frankfurter having said longitudinal and transverse cuts, the frankfurter assumes a substantially annular configuration.

2. The cutting device defined in claim 1 wherein
   (1) said limiting means limits the cutting engagement with a frankfurter to less than the thickness but greater than one-half the thickness thereof.

3. The cutting device defined in claim 2 wherein
   (1) said second cutting elements are relatively positioned such that said transverse cuts are spaced from one-half to one-quarter inches apart along the entire longitudinal dimension of a frankfurter.

4. A cutting device for frankfurters and the like, said cutting device comprising, in combination:
   (A) a base;
   (B) means forming an elongated recess in an upper surface of said base for accommodating a frankfurter; and
   (C) a cutting means mounted to said base for movement toward and away from said upper surface of said base, said cutting member including,
      (1) a first cutting element substantially vertically aligned with said recess for effecting a longitudinal cut in said frankfurter, and
      (2) a plurality of spaced second cutting elements for effecting a series of transverse cuts in said frankfurter intersecting said longitudinal cut,
   (D) limiting means provided by abutment of said cutting means against said base upon movement of said cutting elements into cutting engagement with the frankfurter to limit the depth of said longitudinal and transverse cuts to less than the total thickness of the frankfurter but greater than one-half the thickness thereof.

5. The cutting device defined in claim 4 wherein said second cutting elements are spaced from one-half to one-quarter inches apart.

6. A cutting device for frankfurters and the like, said cutting device comprising, in combination:
   (A) a base having an upper surface;
   (B) means forming an elongated recess in said upper surface of said base for accommodating a frankfurter;
   (C) a frame pivotally mounted to said base for swinging movement toward and away from said upper surface of said base;
   (D) a longitudinal cutting element carried by said frame,
      (1) said longitudinal cutting element being substantially vertically aligned with said recess; and
   (E) a plurality of spaced transverse cutting elements carried by said frame, (1) said transverse cutting elements extending transversely on opposite sides of said longitudinal cutting element;
(F) whereby upon swinging movement of said frame into engagement with said upper surface of said base, said longitudinal cutting element and said transverse cutting elements automatically cut into said frankfurter accommodated in said recess to a depth greater than one-half but less than the total thickness of said frankfurter.

7. The cutting device defined in claim 6 wherein said transverse cutting elements consist of a single wire strung transversely back and forth through consecutive series of transversely aligned holes in said frame and said longitudinal cutting element, (1) each series of transversely aligned holes being spaced apart along the longitudinal dimensions of said longitudinal cutting element and said frame.

8. The cutting device defined in claim 7 wherein said transverse sections of said wire are spaced apart from one-half to one-quarter inches.

References Cited

UNITED STATES PATENTS

| | | |
|---|---|---|
| 893,591 | 7/1908 | Larson. |
| 2,240,221 | 4/1941 | Locker _____ 146—147 |
| 2,675,580 | 4/1954 | Pesce _____ 146—72 X |

W. GRAYDON ABERCROMBIE, *Primary Examiner.*